UNITED STATES PATENT OFFICE.

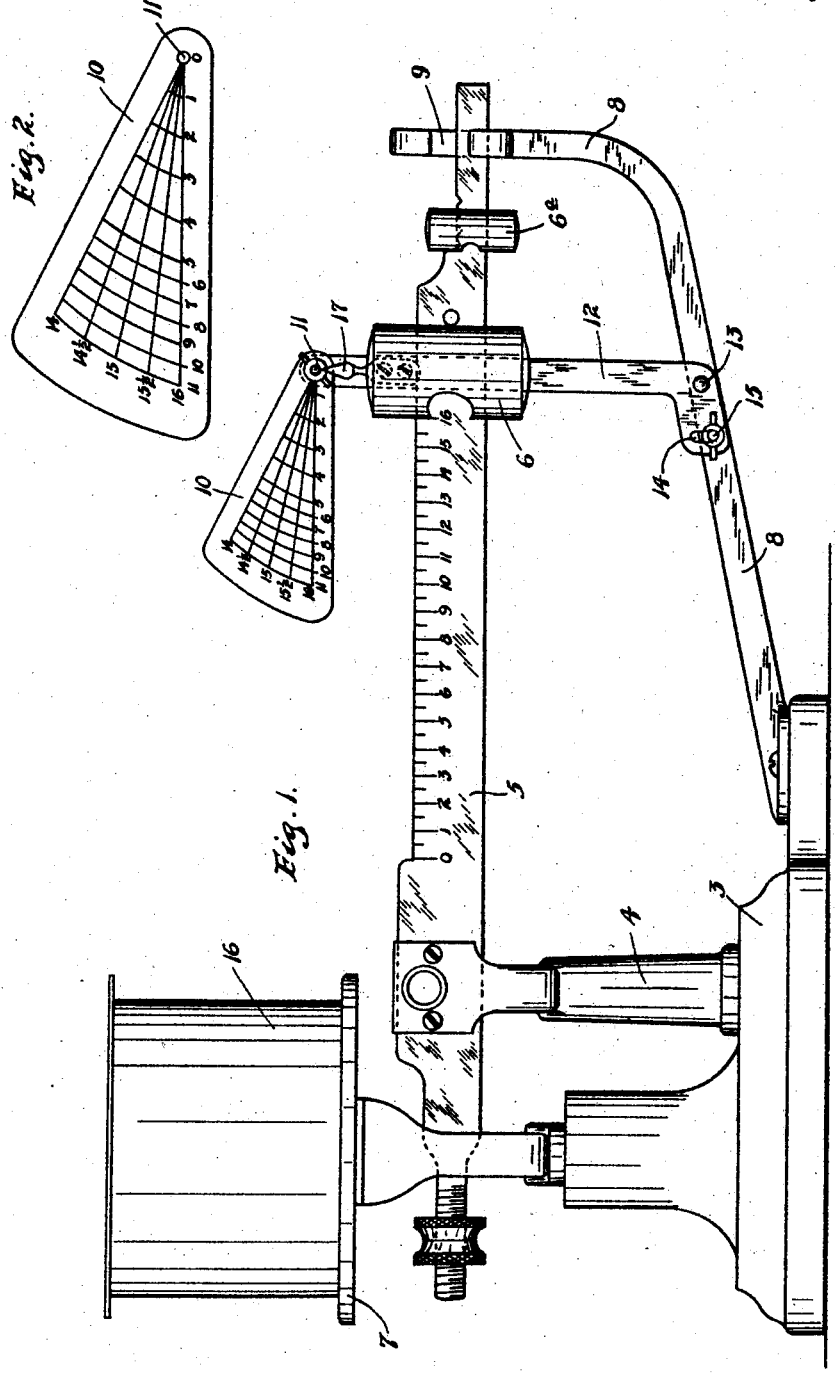

WILLIAM J. McLAUGHLIN, OF OWATONNA, MINNESOTA.

ICE-CREAM OVERRUN TESTER.

1,416,730. Specification of Letters Patent. Patented May 23, 1922.

Application filed May 19, 1920. Serial No. 382,489.

*To all whom it may concern:*

Be it known that I, WILLIAM J. McLAUGHLIN, a citizen of the United States, residing at Owatonna, in the county of Steele and State of Minnesota, have invented certain new and useful Improvements in Ice-Cream Overrun Testers; and I do hereby declare the following to be a full, clear, and exact description of the invention, such as will enable others skilled in the art to which it appertains to make and use the same.

My invention provides, what is termed an ice cream over-run tester, the same being in the nature of an attachment for scales, whereby the percentage of increase in the bulk of ice cream, or the like, in freezing, may be readily determined.

Generally stated, the invention consists of the novel devices and combinations of devices hereinafter described and defined in the claims.

It is a well known fact that the ice cream, in freezing, will very greatly increase in bulk. The extent to which it will increase depends partly on the degree to which it is frozen, and partly upon the nature of the liquid mixture that is being frozen. What is desired by the trade is approximately a 100 per cent increase in the bulk of the frozen ice cream over that of the liquid, per unit of weight. My invention provides a simple and efficient attachment for scales, whereby the operator can readily determine when the 100 per cent increase, or any other percentage of increase desired, may be readily determined.

The invention is illustrated in the accompanying drawings wherein like characters indicate like parts throughout the several views.

Referring to the drawings:

Fig. 1 is a side elevation showing a small beam scale of standard construction having an over-run tester with percentage indicator attached thereto; and Fig. 2 is a detail in elevation, showing the indicator with the percentage indicator removed from the scale proper.

Of the parts of the scale, the numeral 3 indicates the base, the numeral 4 its fulcrum bracket and the numeral 5 the scale beam, the numeral 6 the poise movable on said scale beam, and the numeral 7 indicates the beam-supported load carrying plate of the scale. The scale beam 5 is graduated to indicate ounces and fractions thereof.

In the application of my attachment, I have shown an arm-like bracket 8 attached to the scale beam 3 and provided at its free end with a fork 9 that embraces the extended end of the scale beam and limits the vibratory movements of the latter. The percentage indicator, in the present form of this invention, is in the form of an approximately triangular plate 10, which, near its apex, is pivotally connected at 11 to the upper end of an upright arm 12, which latter, at its lower end, is pivoted to the bracket 8 at 13 and is provided with an extended base having a segmental slot 14 through which, and a perforation in the bracket 8, is passed a nut-equipped bolt 15. When the nut of the bolt 15 is tightened, it will hold the arm 12 in any set adjustment.

The pivot at 11 is preferably made by a nut-equipped bolt, the nut of which is tightened to hold the plate 10 in any desired vertical adjustment.

On the front face of the plate 10 is a graduated scale which, as shown, is made up of five lines that radiate from the axis of the pivot 11. In length, the lower of said radiating lines is one-half the distance represented on the beam 5 between zero mark and the 16-ounce mark; the second radial line from bottom represents one-half the distance between the zero mark and the 15½ ounce mark on scale beam 5; the third radial line from bottom is one-half the length of the distance between the zero and the 15 ounce mark on the beam 5; the fourth radial line from bottom is, in length, one-half the distance between the zero mark and the 14½ ounce mark on beam 5; and the upper radial line is one-half the length of the distance between the zero mark and the 14 ounce mark on said beam 5. The curved lines that intersect the said radial lines divide the several radial lines proportionately into these fractions of the 100 per cent increase. The numeral 16 indicates a measuring cup which will contain approximately 14 to 16 ounces of unfrozen ice cream forming substance and which should contain properly frozen ice-cream in approximately one-half the original weight.

The numeral 17 indicates a pointer carried by the poise 6, the point of which is adapted to register approximately with the axis of the pivot 11.

The weight of the empty cups 16 may be counterbalanced by the supplemental poise 6ª mounted on the extreme end of the beam 5.

The use of the device may be illustrated as follows:

The cup is filled with the liquid ice-cream forming substance and being weighed on the scale will be, for instance, found to weigh just 16 ounces. Then the arm 12 should be adjusted so that the pointer 17 will align with the axis of pivot 11; and then the plate 10 should be adjusted vertically so that its lower radial line marks the outer end, but the numeral 16 indicating 16 ounces, will be in a horizontal position above the scale beam 5. Then during the process of freezing, the frozen ice-cream should be weighed from time to time until it is found that the cup 16, filled therewith, will balance the poise 6 when its pointer 17 is brought to the extreme outer end of the said lower radial line. This, of course, will indicate that the bulk of the ice-cream is increased 100 per cent, or in other words, that the weight per unit of measure is decreased one-half.

To illustrate again, if the cup 16 filled with the liquid ice-cream forming substance indicates a weight thereof of 14 ounces on the scale, then the arms 12 should be moved to the left until the axis of pivot level again registers with pointer 17 and then the plate 10 should be turned down until its upper radial line mark the weight 14 ounces, is brought to a horizontal position over the scale beam 5. Then from time to time, during the freezing of the cream it should be weighed until a cupful thereof balances the poise 6 with the pointer 17 registering with the outer extremity of said upper radial line. This, of course, will then indicate that the liquid ice-cream forming substance has increased its bulk 100 per cent, or in other words, that its weight has been decreased to one-half its original weight, per unit of measure.

Obviously, the invention is capable of modification within the principles above disclosed.

What I claim is:

1. The combination with a weighing scale comprising a single scale beam and a poise movable thereon, of a bulk percentage indicator associated with said scale and co-operating with said poise, said percentage indicator comprising a graduated plate having a plurality of lines of different lengths representing a certain percentage of different original weights, and a pointer on said poise co-operating with said scale to indicate when the bulk of frozen substance has been increased to a proper percentage.

2. The combination with a weighing scale comprising a scale beam and a poise movable thereon, of a bulk percentage indicator associated with said scale and co-operating with said poise, said percentage indicator comprising an arm movable toward and from the zero mark of the scale beam, a graduated plate carried by said arm and having thereon a plurality of lines of different lengths representing a predetermined percentage of different original weights, and a pointer on said poise co-operating with the lines on said plate.

3. The combination with a weighing scale comprising a scale beam and a poise movable thereon, of a bulk percentage indicator associated with said scale and co-operating with said poise, said percentage indicator comprising an arm movable toward and from the zero mark of the scale beam, and a graduated plate pivotally connected to said arm and having a plurality of lines radiating from its pivot, said lines being of different lengths and representing a predetermined percentage of different original weights, means for securing said arm and graduated plate in different adjustments, and a pointer on said poise co-operating with the several lines on said plate.

4. The combination with a weighing scale comprising a scale beam and a poise, of a bulk percentage indicator graduated with a plurality of lines radiating from a point thereon supported adjacent said beam and capable of adjustment to bring said lines into a position substantially horizontal to the said beam, said positions depending upon the original weight of the bulk material, and means on the poise co-operating with the graduations on said indicator.

5. A bulk percentage testing device comprising a scale having the usual scale beam and a poise movable thereon, and a stationary bulk indicator supported adjacent said beam so that said poise is movable on the beam to be brought into a line with said indicator and co-operating therewith, an angularly adjustable supporting arm for said indicator, and means for adjustably supporting said indicator on said arm.

In testimony whereof I affix my signature in presence of two witnesses.

WILLIAM J. McLAUGHLIN.

Witnesses:
IDA STEINBERG,
G. C. JAMES.